United States Patent
Jahnke et al.

(10) Patent No.: US 8,368,017 B2
(45) Date of Patent: Feb. 5, 2013

(54) METHOD FOR THE OPERATION OF A MEASUREMENT SYSTEM WITH A SCANNING PROBE MICROSCOPE AND A MEASUREMENT SYSTEM

(75) Inventors: Torsten Jahnke, Lychen (DE); Michael Richard Haggerty, Berlin (DE)

(73) Assignee: JPK Instruments AG (DE)

( * ) Notice: Subject to any disclaimer, the term of this patent is extended or adjusted under 35 U.S.C. 154(b) by 249 days.

(21) Appl. No.: 12/160,039

(22) PCT Filed: Dec. 21, 2006

(86) PCT No.: PCT/DE2006/002298
§ 371 (c)(1),
(2), (4) Date: Aug. 27, 2008

(87) PCT Pub. No.: WO2007/076828

PCT Pub. Date: Jul. 12, 2007

(65) Prior Publication Data
US 2008/0308726 A1 Dec. 18, 2008

(30) Foreign Application Priority Data
Jan. 4, 2006 (DE) .......................... 10 2006 001 086

(51) Int. Cl.
*G01N 23/00* (2006.01)
(52) U.S. Cl. ................. 250/306; 850/3; 850/9
(58) Field of Classification Search .......... 250/306
See application file for complete search history.

(56) References Cited
U.S. PATENT DOCUMENTS
(Continued)

FOREIGN PATENT DOCUMENTS
JP 2141601 A1 5/1990
JP 4-13902 1/1992
(Continued)

OTHER PUBLICATIONS
Fujii T. et al: "Development of a New Force Microscope with a Fluorescence Optical Microscope", Thin Solid Films, Elsevier-Sequoia S.A., Lausanne, CH, vol. 243, No. 1/2, May 1, 1994, pp. 407-410.
(Continued)

*Primary Examiner* — Phillip A Johnston
(74) *Attorney, Agent, or Firm* — Schmeiser, Olsen & Watts, LLP

(57) ABSTRACT

The invention relates to a method for operating a measurement system containing a scanning probe microscope, in particular an atomic force microscope, and to a measurement system for examining a measurement sample using a scanning probe microscope and for optically examining said sample. In the method, an optical image of a measurement section of a measurement sample to be examined, said image being recorded with the aid of an optical recording device, is displayed on a display apparatus, a choice of a position in the optical image is detected, and, for a scanning probe measurement, a measurement probe which is configured for the scanning probe measurement is moved, using a movement apparatus which moves the measurement probe and the measurement sample relative to one another, to a measurement position, which is assigned to the selected position in the optical image in accordance with coordinate transformation, by virtue of the movement apparatus being controlled in accordance with the coordinate transformation, wherein a previously determined assignment between a coordinate system of the optical image and a coordinate system of a space covered by movement positions of the measurement probe and the measurement sample is formed with the coordinate transformation, wherein the movement positions comprise the measurement position.

20 Claims, 8 Drawing Sheets

U.S. PATENT DOCUMENTS

Figure 1:
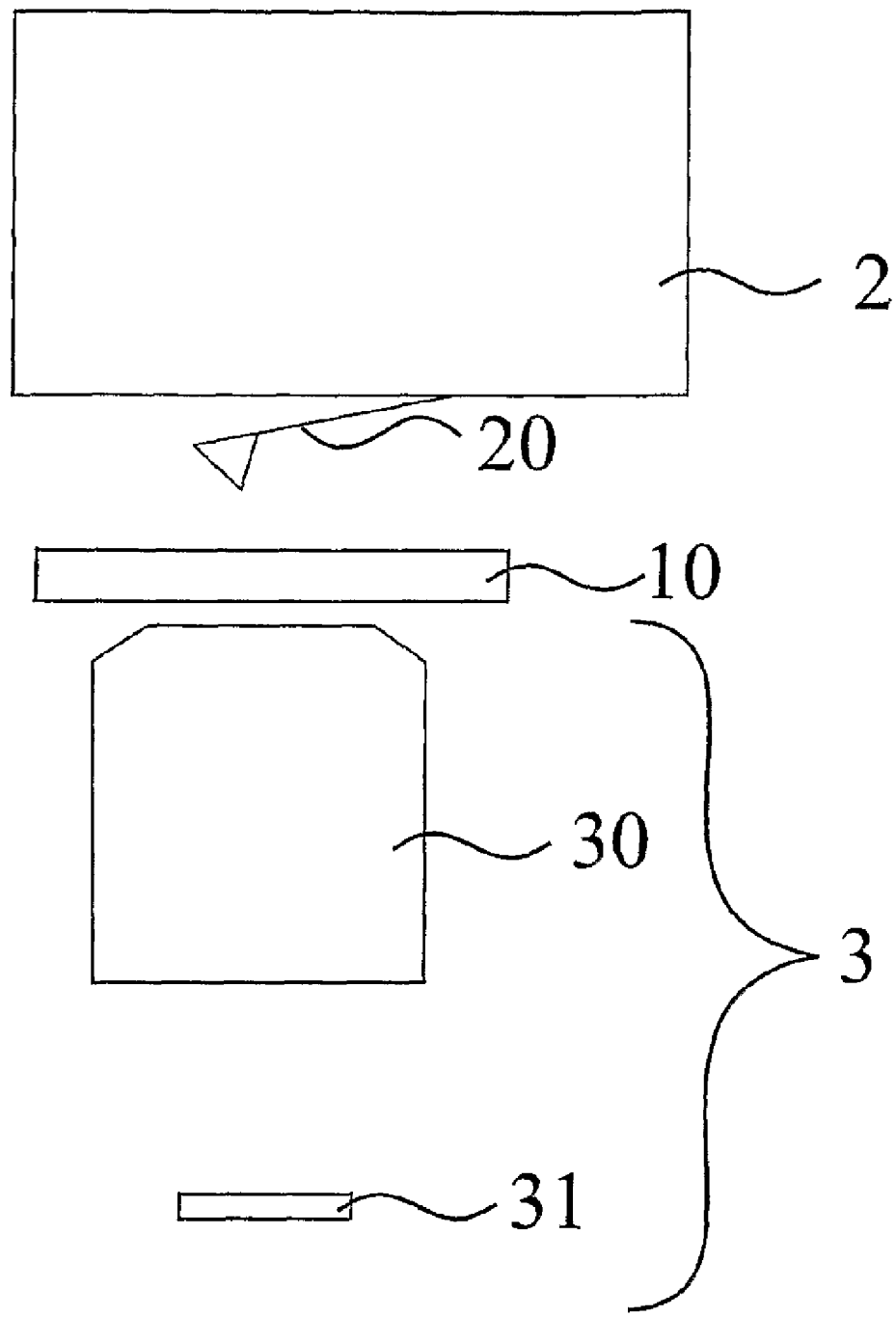

| | | | |
|---|---|---|---|
| 5,517,027 A | | 5/1996 | Nakagawa et al. |
| 5,581,082 A | * | 12/1996 | Hansma et al. .................... 850/3 |
| 5,877,035 A | * | 3/1999 | Fujino et al. ..................... 438/16 |
| 5,953,687 A | * | 9/1999 | Zink et al. ...................... 702/168 |

FOREIGN PATENT DOCUMENTS

| | | |
|---|---|---|
| JP | 6066558 | 3/1994 |
| JP | 6258073 A | 9/1994 |
| JP | 8029354 A | 2/1996 |
| JP | 2002-350320 | 12/2002 |
| JP | 2004-301728 | 10/2004 |
| WO | 03083876 | 10/2003 |

OTHER PUBLICATIONS

Kate Poole: "Tech08/06—True Integration of Optical and Atomic Force Microscopy" JPK Instruments Technical Report, [Online] 2006, pp. 1-4.

Christian Lobbe, Kate Poole: "Two Microscopes, One Software" Imaging & Microscopy, [Online] vol. 8, No. 4, Nov. 2006, pp. 43-44.

European Patent Office; Examination Report dated Oct. 22, 2010.

Japanese office action dated Jan. 10, 2012 in the Japanese counterpart application, Application No. 2008-548926; 4 pages.

Japanese Office Action (Notification of Reasons for Refusal) dated Jan. 10, 2012; Patent Application No. Tokugan 2008-548926; 6 pages.

* cited by examiner

METHOD FOR THE OPERATION OF A MEASUREMENT SYSTEM WITH A SCANNING PROBE MICROSCOPE AND A MEASUREMENT SYSTEM

The invention relates to a method for the operation of a measurement system with a scanning probe microscope, particularly an atomic force microscope, as well as a measurement system.

BACKGROUND OF THE INVENTION

The scanning probe microscopy (SPM) is a technique where a measurement probe scans a measurement sample to be examined and, in doing so for example, records a topography of the measurement sample. In this context, a relative movement takes place between the measurement probe and the measurement sample which is attained in such a way that at least the measurement probe or at least the measurement sample is moved. Normally, the relative movement is performed as a lateral movement. In addition, a relative movement can also take place in the vertical direction. One form of the scanning probe microscopy is the scanning force microscopy (SFM). With an atomic force microscope used in this case, the measurement probe is formed in the design of a cantilever which carries a fine measurement tip.

It is a great advantage to combine the scanning probe microscopy with the classic optical microscopy in order to be able to assign more advantageously the measurement results found in the scanning probe microscopy to structures of the measurement sample which, on their part, are taken from optical images of the optical microscopy. In this case and in accordance with the state of the art, an optical image is recorded with the assistance of the optical microscopy and stored preferentially in a digital manner. In a similar way, an SPM-image is produced and stored in the framework of the scanning probe microscopy of the same measurement sample. The images produced in both measurements are finally brought to congruence by means of an image processing program. Certain prerequisites must be fulfilled for this purpose.

First of all, the optical image and the SPM-image must be very accurately calibrated. For the SPM-image, this requirement is already materialised in many commercially available devices because of the use of sensors which detect the lateral movement of the measurement probe. Where the optical image is concerned, an exact calibration is normally waived, particularly in the life sciences. However, a calibration is also possible by means of a lens micrometer for example.

Furthermore, the information from the optical image and the SPM-image must be comparable. This is often the case, however not inevitable, because the mechanisms of the contrast origination are very different in both measurements. In this way, the intended congruence between both images can be impossible.

In addition the SPM-image must show a section, on which sufficient characteristic details are recognisable which are also to be identified in the optical image in order to enable, in this way, an assignment between the two images. This requirement is a major restriction because the SPM-images produced in the scanning probe measurements frequently show only a small section of the measurement sample to be examined. Larger areas of the measurement sample to be examined can frequently not be detected without damaging the measurement probe in the process. In some experimental examinations an SPM-image is not produced because a force-distance-curve is measured only at a single or at several single locations on the measurement sample.

On the whole, the method as described above for the assignment between two image points in the optical image obtained by means of an optical recording device and in the measurement results of the scanning probe microscopy is inexact and has only a limited expressive statement.

It is furthermore known to use a video image recording within the framework of the scanning probe microscopy as an orientation support for the positioning of the measurement probe relative to the measurement sample, where said video recording image shows an optical image of a measurement section of the surface of the measurement sample with the measurement probe positioned thereon. However, problems arise here to that extent that the measurement probe normally shadows off a partial sector of the video image, through which an orientation for the positioning of the measurement probe is made very difficult. In addition, estimating the borders of the video image is just difficult in this way.

SUMMARY OF THE INVENTION

The object of the invention is to provide an improved method for the operation of a measurement system with a scanning probe microscope as well as a measurement system with a scanning probe microscope, with which an exact positioning of the measurement probe is facilitated relative to a measurement sample to be examined.

This object is solved according to the invention by means of a method for operating a measurement system with a scanning probe microscope according to the independent claim 1 as well as a measurement system with a scanning probe microscope according to the independent claim 10.

The invention comprises the concept of showing a recorded optical image of a measurement section of a measurement sample under examination on a display apparatus during the operation of a measurement system with a scanning probe microscope, particularly an atomic force microscope, with the support of an optical recording device, a CCD-camera for example. Following the selection of a position in the optical image which the user can perform, for example with the help of a keyboard, a mouse or a soft-touch of the display apparatus, a measurement probe configured for a scanning probe measurement is moved, by means of a movement apparatus that moves the measurement probe and the measurement sample relative to one another, to a measurement position which is assigned to the position selected in the optical image according to a coordinate transformation, which can also be designated as a local assignment or a local transformation, by controlling the movement apparatus in accordance with the coordinate transformation. The previously determined coordinate transformation forms an assignment between a coordinate system of the optical image and a coordinate system of a space covered by movement positions of the measurement probe and the measurement sample, wherein the movement positions comprise the measurement position. The determination of the coordinate transformation is carried out in a preferably experimental manner by deriving a generalised rule of transformation from an assignment between one or several image points in one or several optical images, on the one hand, and corresponding measurement positions in the arrangement of measurement probe and measurement sample, on the other hand, with which the two coordinate systems can be imaged one on the other. This is then "made available" to the control unit of the scanning probe microscope in order to correspondingly control the movement apparatus when a selection of one or several image points in an optical image is detected during a scanning probe microscopic examination.

During the scanning probe microscopy it is therefore made possible to arrange the measurement probe opposite the measurement sample under examination exactly in one or several measurement positions which, on their part, correspond to one arranged position in the optical image in each case. If the user of the scanning probe microscope, for example, wants to perform a scanning probe measurement in a sector of the measurement sample which protrudes on the optical image as a characteristic point, for example because of its high contrast ratio to the image points in the optical image surrounding it, then only this point in the optical image is to be selected and the measurement probe is then moved with the support of the movement apparatus, with due consideration of the coordinate transformation, exactly to the measurement point which corresponds to the point selected on the measurement sample in the optical image.

For the coordinate transformation, various transformation methods can be adopted which realise a local or position assignment between optical image on the one hand and measurement space with measurement sample and measurement probe on the other hand and, with regard to their mathematical tools applied here, are known as such to the expert in their various embodiments. Presently known transformation methods are, for example, the use of a matrix for the linear case. For the non-linear case, for example, transformations by means of multiple-dimensional polynomial regulations are used, for example a two-dimensional polynomial regulation for each point to be transformed.

A preferred embodiment envisages that the coordinate transformation is made available by means of a software implementation in a control apparatus which, on its part, interacts with the display apparatus and the movement apparatus. In the result of the coordinate transformation, a calibration is provided between the illustration of the optical image on the display apparatus on the one hand, and the positioning of the measurement probe relative to the measurement sample under examination on the other hand which ensures an exact movement of the measurement probe, corresponding to the selection in the optical image, relative to the measurement sample. It can be envisaged to examine the coordinate transformation during the scanning probe microscopic examination or, selectively, to renew once or several times, which then represents a kind of recalibration.

A preferred further development of the invention envisages that a scanning probe measurement value is detected for the measurement position by a measurement tip formed on the measurement probe being brought into the measurement position during the movement. For a purposeful embodiment of the invention it can be envisaged that the measurement probe is displayed at least partially in the optical image on the display apparatus.

An advantageous embodiment of the invention envisages that the measurement section is shown in the optical image without the measurement probe. This can be materialised, for example, by moving the measurement probe completely out of the zone of the optical image. As a rule, the movement mechanism used for measuring purposes of scanning is inadequate in this case, or only the measurement sample is moved. For this reason, a second movement mechanism can be envisaged for a rough movement of the measurement probe. A further preferred embodiment envisages the movement of the measurement probe to various positions and to record, in each case, an optical image of the measurement sample together with the measurement probe. After this, all optical images can be put into a median filter which filters out the measurement probe from the original images as it is an object that is shown differently in each of the optical images. Median filter mechanisms are known as such in various embodiments.

A further development of the invention preferably envisages that, as an optical image, a momentary optical recording is shown in a live operating mode, and this can be implemented by means of video recordings for example.

It can be envisaged with an advantageous embodiment of the invention that a scanning probe measurement image with scanning probe measurement values is shown on the display device, selectively in an at least partially superimposing presentation of optical image and scanning probe measurement image according to the coordinate transformation.

A further development of the invention can envisage that the presentation of the optical image of the measurement section is renewed repeatedly on the display device.

A further development of the invention preferably envisages that the coordinate transformation is determined by comparing with one another one or several image points from one or several optical images, on the one hand, and relevant measurement positions in the arrangement of measurement probe and measurement sample on the other hand, and from this a generalised transformation rule is derived. Therefore, the calibration is carried out in this embodiment without the necessity of having scanning probe microscopic measurement value recordings for this purpose.

For an advantageous embodiment of the invention it can be envisaged that the one or the several optical images are recorded as at least one imaging type selected from the following group of image types: fluorescence image, back-lighting image and Raman spectroscopic image. The optical images are preferably produced with one of the optical examining methods as stated above. A usage of images of several of the examining types can also be envisaged.

As follows, further preferred embodiments of the invention are described in greater detail, particularly purposeful embodiments of the calibration between optical image on the one hand, and measurement probe movement relative to the measurement sample on the other.

For the SPM-measurement, a Cartesian coordinate system is defined for the space covered by the movement positions of the measurement probe and the measurement sample by the movement axes of the movement apparatus with which the measurement probe and the measurement sample can be moved relative to one another. In this case, the movement apparatus can also and certainly initiate rotations of the components moved by it, and this can also be imaged by way of a transformation into a Cartesian coordinate system. The return action to a Cartesian coordinate system is not a necessary integral part of the method, but it does facilitate the comprehension. In many cases the alignment of the movement apparatus to the optical axis is different from measurement to measurement, so that a factory calibration is impossible. The situation is similar with the origin of the Cartesian coordinate system. In most cases, for example, the user puts in the measurement probe manually and the location of the interaction between measurement probe and measurement sample is subsequently different from measurement to measurement.

In the case of the movement apparatus where the measurement probe is moved laterally, two potential or actual measurement positions can now be approached with the measurement probe in the coordinate system of the movement apparatus. If corresponding image points can be assigned to the two positions in the optical image, then this assignment defines a transformation regulation between image points of the optical image and measurement positions of the measurement probe which, on their part, correspond to certain positions of the movement apparatus, meaning, certain setting or control values of the movement apparatus. This uncomplicated case where only two points are used applies only, of course, when only a translation and a rotation have to be carried out. The coordinate trans-formation can then be used during a following scanning probe microscopic examination in order to position the measurement probe, according to a selection in the optical image with the support of the movement apparatus, opposite the measurement sample. Even during the duration period of the experimental scanning probe microscopic examination, information from both examining methods, namely the optical examination of the measurement sample and the scanning probe microscopic examination, can be compared with one another in this way. For such a case where a complicated transformation has to be carried out, more points must also be determined accordingly.

With regard to the concrete image make-up and presentation on the display apparatus, there are various selection options available. In order to provide the user of the scanning probe microscope with a familiar view, it can be envisaged to limit the optical image in such a way that a rectangular image is seen whose sides are parallel to the two movement axes of the lateral movement performed with the support of the movement apparatus.

It can also be envisaged that the optical image is not displayed as a momentary image or as a live image if and when, for example, the measurement probe scanning the measurement sample is perceived as being very unsteady. For a desired orientation on the measurement sample, it is purposeful to make a previous image recording with a measurement sample that does not change too quickly, namely an optical image recording before approaching measurement positions of the measurement probe. This consideration also applies in such a case where the measurement sample is scanned. With a previous image recording, it is then advantageous to remove the measurement probe with the movement apparatus as far as possible out of the scanning area, so that as many details as possible of the measurement sample surface can be displayed undisturbed. This is of greater significance for a back-lighting application than for a measurement according to the fluorescence method.

It can also be envisaged that several images are displayed above one another on the display apparatus, these being optical images and/or SPM-images, wherein individual images can be removed or entered. It is purposeful in this correlation to present accordingly the several images to a common coordinate system so that overlying image points of the various images correspond to the same position on the measurement sample. It is advantageous in this case if partially transparent illustrations of the images are used. If the SPM-image is removed, a very good orientation is possible, meaning, only the optical image is displayed. In addition to the removal of the one or the several SPM-images, there is also the option for using colouring codes of optically displayed information.

Moreover, further information can also be displayed on the display apparatus. For example, this includes points on which a scanning probe microscopy has been carried out, but also lines on which a manipulation has taken place. The image points on the display apparatus shown in this way can have electronic data assigned to them in the usual manner, onto which access can be had by way of menu functions, for example by clicking onto the display image points.

Situations can occur where the location of the interaction between measurement probe and measurement sample cannot be determined to a sufficiently exact degree. It can also be the case that, with the coordinate transformation for the assignment of positions in the optical image on the one hand and positions in the coordinate system of the measurement probe and the measurement sample on the other hand, another position is adopted as a reference point instead of the preferred usage of the interaction location, meaning, the location in the zone of the measurement tip on the measurement probe. In this case, the coordinate trans-formation must take into consideration the distance between the location of the measurement tip and the reference point. There are several options available for determining this distance which can be assigned to a transfer vector. For example, a further experimental examination can be used for this purpose, in particular an electron microscope examination. Information from the data sheet of the measurement probe can also be used. An image comparison can also be envisaged. Particularly with a measurement sample with a multiplicity of similar characteristic features or also periodically repeating patterns, a substantial improvement is obtainable opposite an image comparison without further indications. A prerequisite in this case, however, is a comparable information from both examining methods.

Facts have shown that a linear image during coordinate transformation is only partially effective in certain cases for the various examination surroundings. It can therefore be envisaged, for the coordinate transformation in addition to a shifting and an angle transformation, to additionally give consideration to yet a further adaptation, for example a polynomial adaptation of the second order. Examination have shown that, with a customary measurement apparatus, preferably up to 25 measurement points are usable in order to ensure an sufficiently accurate coordinate transformation.

The measurement system with scanning probe microscope and the recording device for recording optical images has a control device with which the determined coordinate transformation is implemented so that, after selection of a position in the displayed optical image, measurement probe and measurement sample under examination are correspondingly positioned with the support of the movement device. The control signals necessary for activating the movement apparatus initiate the control device according to the implementation of the coordinate transformation. It can be additionally envisaged that the control device is configured for an advance calibration process in which the coordinate transformation is determined. For this purpose, software-based applications can be preferably implemented in the control device which serve the particular purpose of detecting optical image points and relevant positionings of measurement probe and measurement sample by means of the movement device and to selectively derive a transformation regulation therefrom. Such a pre-calibration process can be again used by the user of the measurement system, also during the performance of a scanning probe microscopic examination for the purpose of carrying out a recalibration.

The method as described is usable for random types of scanning probe microscopy in particular. In addition to the atomic force microscopy the usage can also be envisaged with other microscopic examinations, for example the scan photonic microscopy (SPhM) where images of a measurement sample can be recorded with the help of an optical tweezers, or the scanning nearfield optical microscopy (SNOM). The method is also usable if, in the exceptional case in the optical image, only one point is known and the scanning probe microscopic examination is to be carried out exactly in this point of the measurement sample. In this case, a location assignment only takes place between two positions, namely an image point in the optical image and in a measurement position.

A DESCRIPTION OF PREFERRED EMBODIMENTS OF THE INVENTION

Figure 2:
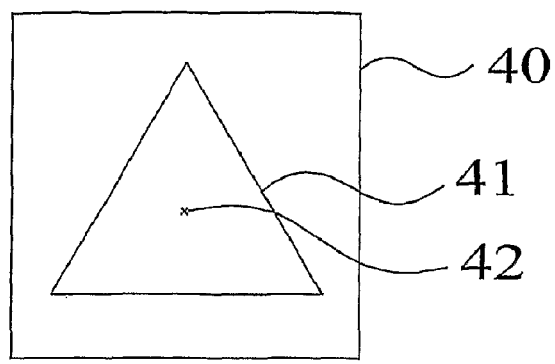
Figure 2:
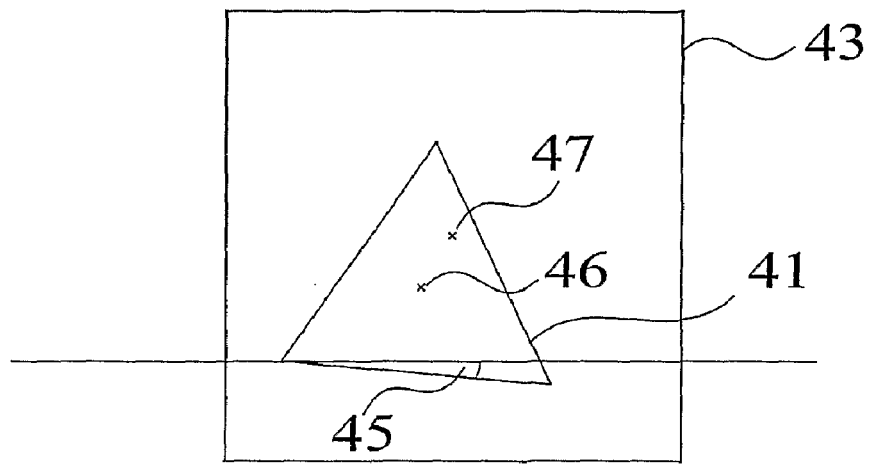
Figure 2:
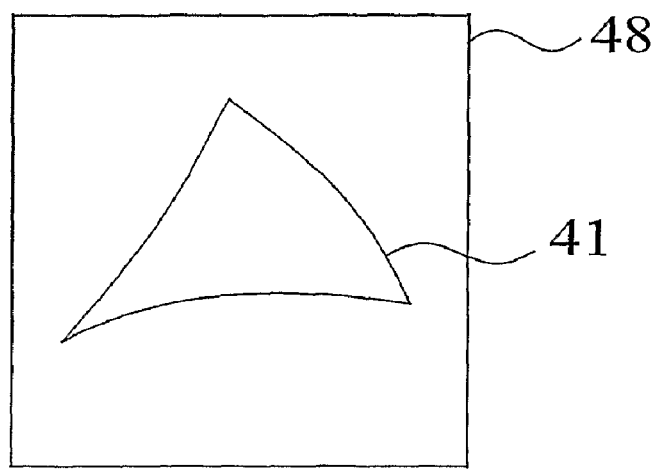
Figure 3:
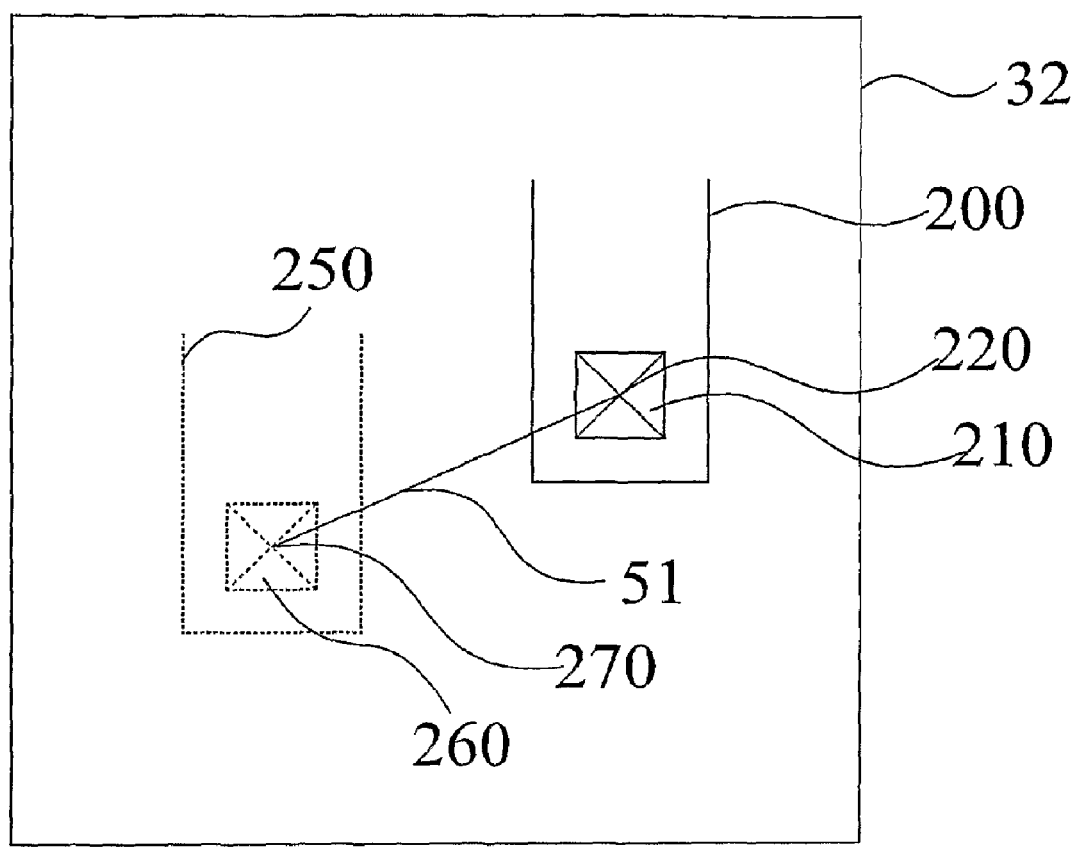
Figure 4:
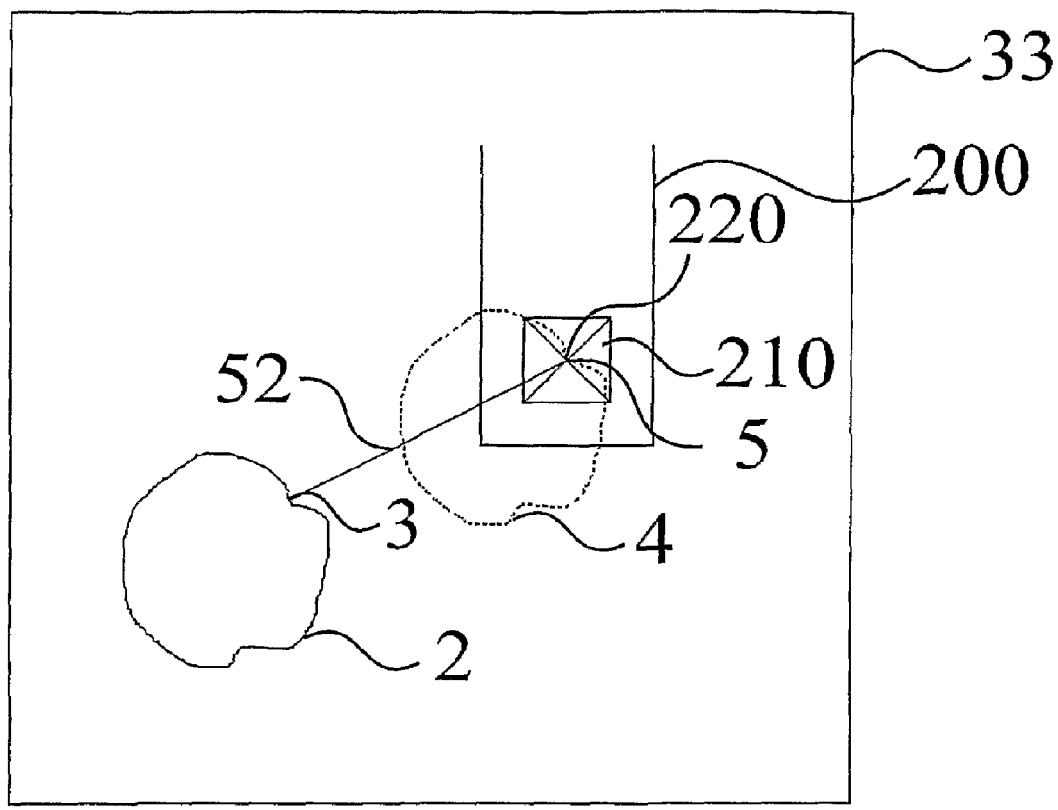
Figure 5:
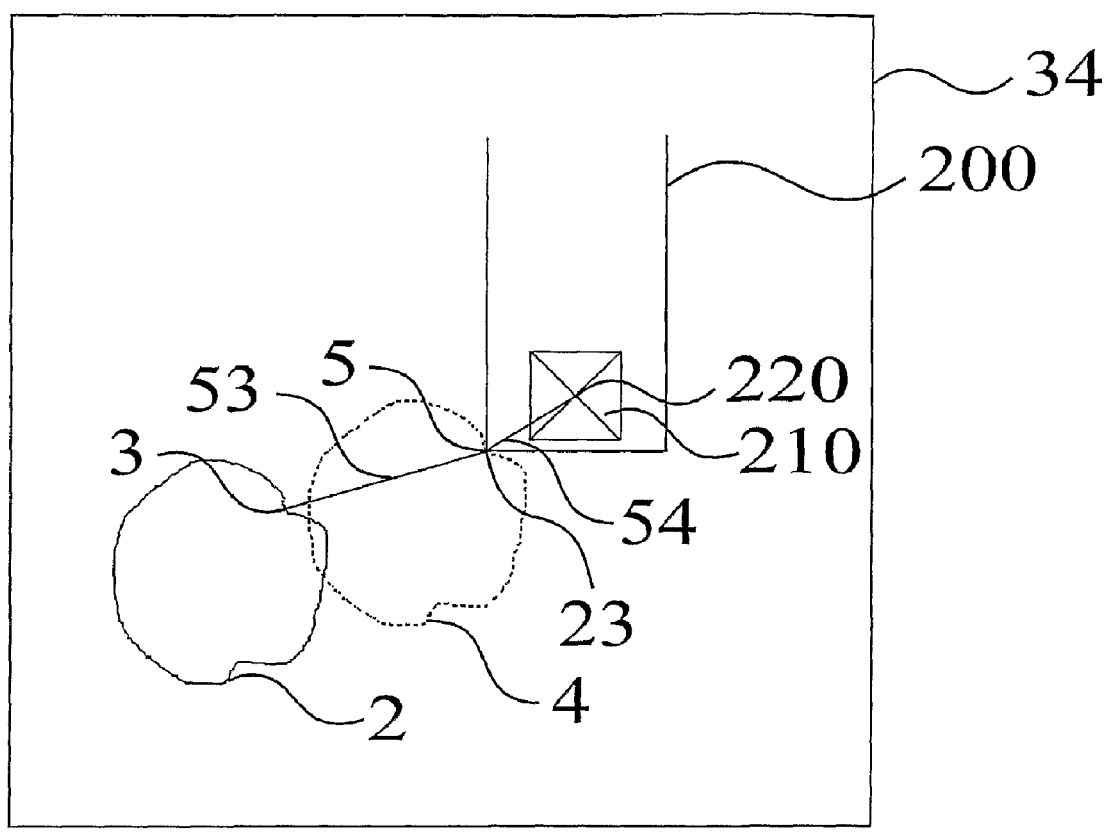
Figure 6:
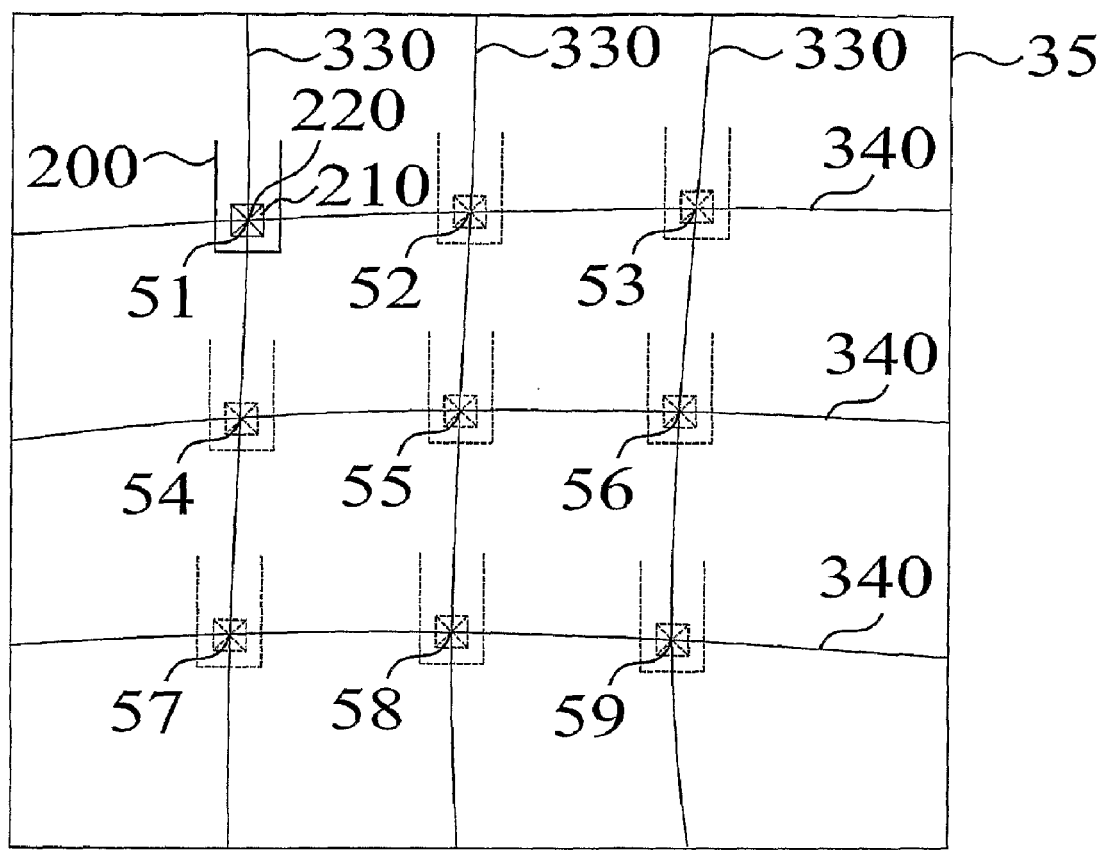
Figure 7:
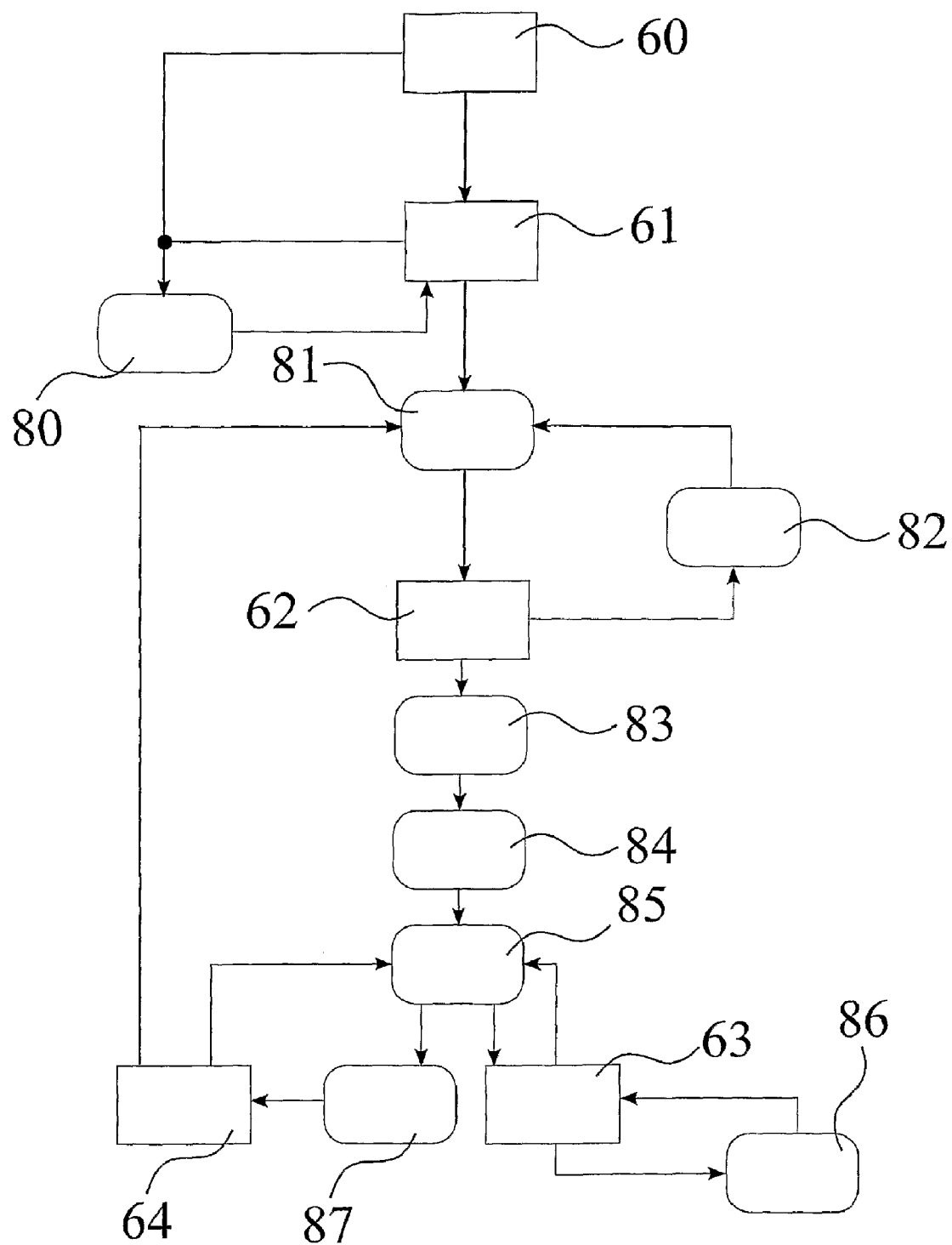

The invention is described as follows in greater detail on the basis of embodiment examples with reference to the Figures of a drawing. The Figures show the following:

FIG. 1a schematic illustration of a section of a measurement arrangement;

FIG. 2 a schematic illustration of an equilateral triangle in three different coordinate systems;

FIG. 3 a schematic illustration for calibrating an angle and an offset in the case of a probe scanner;

FIG. 4 an optical image of a cantilever with measurement tip and reference point;

FIG. 5 a further optical image of the cantilever with measurement tip and reference point;

FIG. 6 another optical image with the cantilever;

FIG. 7 a sequence diagram and

Figure 8:
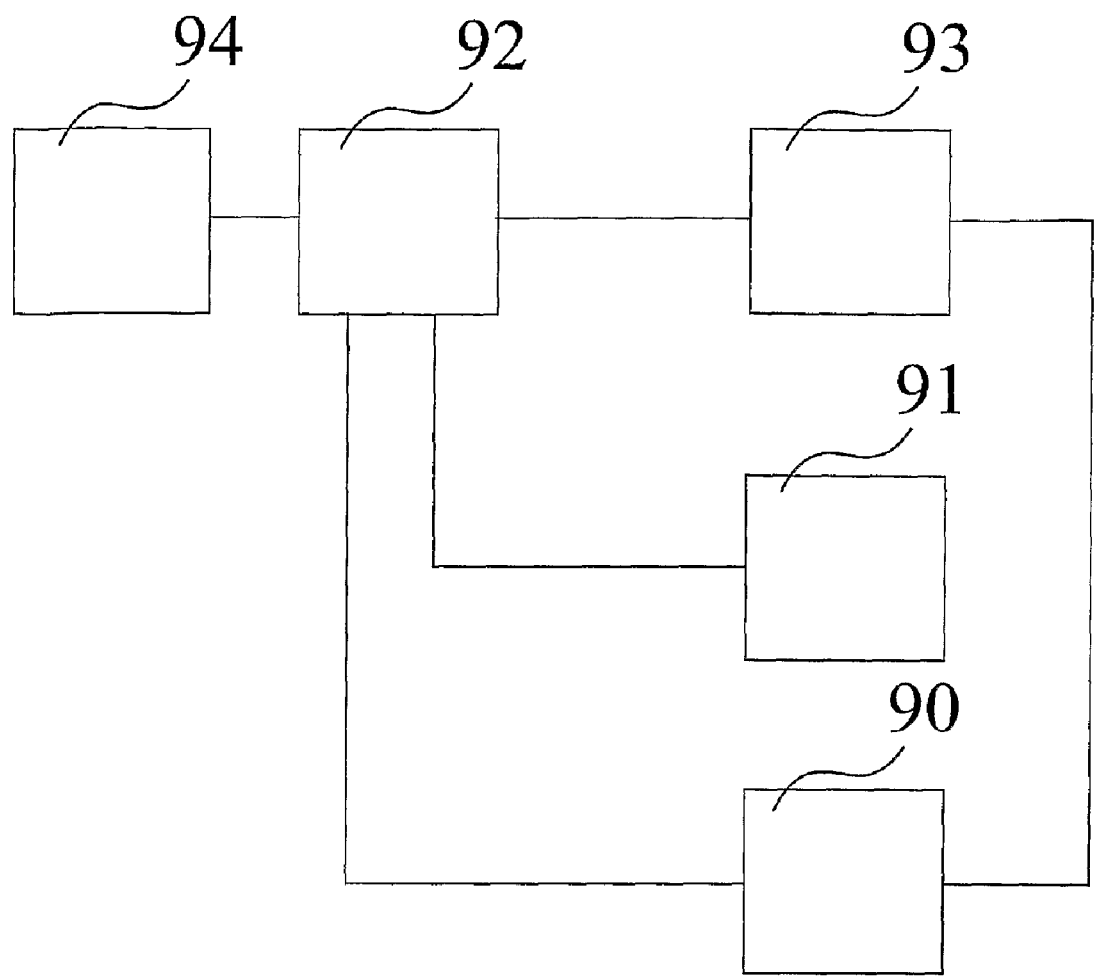

FIG. 8 a schematic illustration of a measurement system.

FIG. 1 shows a schematic illustration of a section of a measurement arrangement with various coordinate systems. A coordinate system $\Sigma_1$ is assigned to a measurement sample 1 to be examined. A further coordinate system $\Sigma_2$ is assigned to a measurement probe 20 which is held at a holding device 2 and is configured for a scanning probe microscopic examination of the measurement sample 1. According to an alternative mode of observation, a common coordinate system can also be assigned to an arrangement with measurement sample 1 and measurement probe 20. One of the two coordinate systems $\Sigma_1, \Sigma_2$ is unmoved relative to an observer 3, depending in each case whether the measurement probe 20 and/or the measurement sample 10 are moved during positioning relative to one another. The observer 3, here by way of example and in a simplified manner, is sketched by a lens 30 and a CCD-chip 31 which form a system for recording optical images of the measurement sample 1. Another coordinate system $\Sigma_3$ is assigned to the observer 3.

FIG. 2 shows a schematic illustration of an equilateral triangle in three different coordinate systems. The equilateral triangle, designated in FIG. 2 with the reference number 41, forms an assumed examination object which is shown in an SPM-image (upper picture), in an optical image (central picture) as well as in a further optical image (lower picture).

In the assumption that the triangle 41 is a real structure which can be examined by means of an optical examination as well as scanning probe microscopy, so that at least an optical image and an image of the measurement results of the scanning probe microscopy (SPM-image) can be produced, the upper picture in FIG. 2 shows an SPM-image 40 with a scan size indicated with the help of bordering lines where, because of a calibrated movement apparatus with which the measurement probe and measurement sample are moved relative to one another, an equilateral triangle 41 is illustrated. There is an origin 42 in the centre of the equilateral triangle 41 which, for reasons of simplification, coincides with the centre of the SPM-image 40.

In the central picture in FIG. 2, an optical image 43 of the equilateral triangle 41 is shown where there are no optical image errors. In this case there is just a turning of the triangle 41 by an angle 45 and a moving of the central point of the triangle 41 to the point 46 relative to the origin 47 of the optical image 43 which is again in the centre of the image.

In the lower picture in FIG. 2 a further optical image 48 of the triangle 41 is shown, wherein optical distortions occur with this optical recording. It is evident here that a simple transformation in the form of a rotation or translation is insufficient for the purpose of establishing a congruence between the triangle from the further optical image in the lower picture in FIG. 2 and the triangle in the SPM-image 40 in the upper picture in FIG. 2.

FIG. 3 shows a schematic illustration for the calibration of an angle and an offset by means of a scanning device of a scanning probe microscope. With the help of the scanning device, measurement probe and measurement sample are moved relative to one another during a scanning probe microscopic examination. An optical image 32 of a measurement probe executed as a cantilever 200 is shown which is recorded by means of a CCD-chip 31. The cantilever 200 has a pyramid-shaped measurement tip 210 whose tip forms a reference point 220. For reasons of simplification in this case, as well as in the following figures, only the front part of the cantilever 200 is shown. By means of a movement with the help of the reference by a vector 51, the cantilever 200 attains a changed position which is shown with the help of dashed lines 250, 260, 270. By means of the position of the reference point 220, 270 on the optical image 32, a transformation (translation and rotation) of the optical image 32 can now be performed into the space of the reference, namely the coordinate system assigned to the arrangement with cantilever 200 and the measurement sample to be examined. This is then sufficiently accurate if the optical image 32 is not more strongly distorted than the desired resolution of the scanning probe microscope measurement is shown.

FIG. 4 shows a further optical image 33 of the cantilever 200 with measurement tip 210 and reference point 220, which is now stationary because the measurement sample 10 is moved. A visible part of the measurement sample 2 encloses a distinctive point 3 which is transferred into a new position 4, 5 by means of a movement of the reference by a vector 52. The ideal case presented above is shown here wherein the distinctive point 5 exactly coincides with the reference point 220, namely the tip of the cantilever 200 which is also responsible for the interaction. By means of the positions of the reference point 220 and the distinctive point 3, 5, a transformation (translation and rotation) of the further optical image 33 into the space of the reference can again be carried out.

FIG. 5 shows again the situation as in FIG. 4 in an optical image 34, however the distinctive point 3 is now moved from the reference by a vector 53 into a new position to a corner 23 of the cantilever 200 which serves here as a reference point. If the vector 54 is now known, then the coordinate transformation as described in conjunction with FIG. 4 is also possible here.

FIG. 6 shows another optical image 35 with the cantilever 200 which was recorded by means of the CCD-chip 31.

The reference point 220 is moved successively from a reference to nine various locations which are indicated in the drawing with dashed lines. These locations are the four corners, the four lateral central points and the central point of a square. These points are the intersection points of three parallels with identical distance and, to these, three orthogonal parallels with identical distance. In the other optical image 35 the vertical lines 330 are now no longer parallel to one another, and the horizontal lines 340 are also not parallel. Accordingly, measurement positions 51, . . . , 59 also are, as expected, no longer arranged on a square. The location of the points now allows the calculation of a transformation instruction to the transformation of the other optical image 35 into the space of the reference and, subsequently, into the coordinate system of the atomic force microscope. Another point arrangement can also be selected. A once gained transformation instruction remains upheld as a rule if the optics for the recording of the optical image do not change substantially. Accordingly, it is possible to make a rough adjustment for the measurement sample and to apply the same transformation to a new optical image. For such a case where the cantilever 200 is moved in any form except through the reference itself, then only the plain transformation has to be carried out according to the method described above.

FIG. 7 shows a sequence diagram to elucidate the method.

First of all, an examination is carried out according to partial step 60 to find out if the measurement probe 20 in the optical image is visible. If the measurement probe 20 in the optical image is visible, an examination in partial step 61 is carried out to find out if this is the case for all planned measurement positions of the measurement probe 20 in the scanning probe microscopic examination. If this condition is also fulfilled, the actual scanning probe microscopic measurement can be started directly.

If one of the two conditions already mentioned is not fulfilled, a relative movement of the measurement probe 20 is carried out according to partial step 80 with the support of a rough movement, and the partial step 61 is carried out anew. It is assumed here in a simplified manner that a first movement is performed for such a period of time until the measurement probe 20 is visible in the displayed optical image, so that a return to the partial step 60 is not necessary.

The movement apparatus on the whole is executed preferably in such a way that, on the one hand, the exact and high-resolution scanning movement during the scanning probe microscopic examination can be performed with a fine-movement mechanism, for example with the use of piezo elements. The positioning accuracy of the fine-movement mechanism adopted in this case usually lies in the submicrometer range, preferably in the nanometer range. On the other hand, measurement probe and measurement sample receptacle can be moved roughly to one another with a rough movement mechanism, for example for moving out the measurement probe out of the optical images adopted for the pre-calibration.

Now, and according to partial step 81 for calibration purposes, an optical image is recorded and stored, preferably in the form of electronic digital data. In partial step 62 an examination is performed to find out if there is a sufficient amount of optical images available for the calibration to be carried out by means of coordinate transformation. For example, the number of optical images can be sufficient if a pre-determined number of measurement positions was approached with the measurement probe and a relevant optical image was recorded. If this is not the case, the measurement probe 20 is moved according to partial step 82 and, in the partial step 81, an optical image is recorded anew.

If the examination in the partial step 62 leads to a positive result, a corresponding image point in the optical image is determined according to partial step 83 by means of a suitable algorithm for each measurement probe position, where said image point coincides with a measurement tip formed at the measurement probe with a preferred embodiment. This can be carried out with image processing methods which are known as such. As an alternative, the user can select at least one position on the measurement probe 20. It can also be envisaged to use the algorithm performed in the partial step 83 in conjunction with the partial step 62 for automated or partially automated examination.

If there is now a scanning of image points in the optical image whose opposing distances are known exactly, a coordinate transformation regulation can be gained therefrom according to partial step 84 which images the optical image onto the shifting movement of the measurement probe 20. The coordinate transformation was subsequently determined in a pre-calibration before the performance of scanning probe microscopic examinations under exclusive usage of optical images.

For the case where the measurement tip of the measurement probe 20 can be adequately and exactly localised, the origin of the two coordinate systems, namely the coordinate system of the optical image and the coordinate system for the movement positions of the measurement probe opposite the measurement sample, can be identically selected.

With the coordinate transformation obtained in this way, the illustration of the optical image according to partial step 85 is enabled in a window on the display device, and it is also enabled to select an area in this window in which then an image of scanning probe microscopic measurement results are to be recorded. It can also be envisaged that only one image point in the optical image is selected for a force-distance-spectroscopy. The measurement results of the scanning probe microscopic examination can then also be displayed in the window on the display apparatus. It can be envisaged in this connection to assign different colours to the various images. Moreover, at least partially transparent images can be adopted.

If an optical image of the measurement probe 20 is recorded and if reference details are recognisable both in the optical image as well as in the scanning probe microscopic image, an examination in a partial step 63 can be carried out to find out whether the previously determined coordinate transformation has been sufficient. If this is not the case, a non-recurrent and minor correction is carried out according to partial step 86. If no correction is necessary, the process is continued with partial step 85 until the measurement sample is moved into partial step 87. In this case an examination is carried out according to partial step 64 to find out whether the movement of the measurement sample, meaning the movement of the coordinate system $\Sigma_1$, causes a change of the optics for the recording of the optical image. If this is the case, a calibration is performed again wherein optical images are recorded according to partial step 81. If the examination in the partial step 64 is negative, which will be for example the case for a cover glass or other usual assembly groups in the image recording optics, then the old optical image can be replaced by a new optical image in partial step 85. In this case, it can be envisaged that a live image is shown in the background.

FIG. 8 shows a schematic illustration of a measurement system with a scanning probe microscope 90 and a recording device 91 which is configured for recording optical images of sections of a measurement sample to be examined with the scanning probe microscope 90. This recording device 91 can be, for example, a microscope equipped with a CCD-camera. A display apparatus 92 is coupled to the recording device 91, for example a screen or a monitor in conjunction with a computer that is configured for the purpose of displaying the optical images recorded with the help of the recording device 91. In addition, the display apparatus 92 is set up in order to show also the measurement results of the scanning probe microscopic examination, preferably in the form of superimposing presentations, namely for example an optical image and an image of the scanning probe microscope in the same coordinate system. The display apparatus 92 is coupled to a control apparatus 93 so that, with the support of an input apparatus 94 which can be selectively integrated in the scanning probe microscope 90 or the recording device 91, the user can detect the performed selections of positions in the displayed optical images. The control apparatus 93 is formed by a computer program, for example. The input apparatus is purposefully a computer mouse or a keyboard. During a scanning probe microscopic examination, the control apparatus 93 then subsequently generates electric control signals which are transmitted to the movement device of the scanning probe microscope 90 in order to correspondingly position measurement sample and measurement probe.

The features of the invention as disclosed in this description, in the claims and in the drawings can be of significance both individually as well as in random combination for the realisation of the invention in its various embodiments.

The claims are as follow:

1. A method for operating a measurement system with a scanning probe microscope, particularly an atomic force microscope wherein:
    an optical image of a measurement section of a measurement sample to be examined is recorded by an optical recording device during the operation of the measurement system with the scanning probe microscope;
    the optical image is transformed according to a previously determined coordinate transformation, which is an assignment between a coordinate system of the optical image and a coordinate system of a space covered by movement positions of a measurement probe and a measurement sample, wherein the optical image is transformed during the operation of the measurement system with the scanning probe microscope;
    the transformed optical image is displayed on a display apparatus during the operation of the measurement system with the scanning probe microscope;
    a selection of a position in the transformed optical image is detected; and
    for a scanning probe measurement, the measurement probe that is configured for the scanning probe measurement is moved, by means of a movement apparatus that moves the measurement probe and the measurement sample relative to one another, to a measurement position which is comprised in the movement positions and assigned to the selected position in the transformed optical image according to the coordinate transformation by controlling the movement apparatus in accordance with the coordinate transformation.

2. The method according to claim 1, characterized in that a scanning probe measurement value is detected for the measurement position by a measurement tip formed on the measurement probe being brought into the measurement position during the operation into the measurement position.

3. The method according to claims 1, characterized in that the measurement probe is displayed at least partially in the transformed optical image on the display apparatus.

4. The method according to claims 1, characterized in that the measurement section in the transformed optical image is displayed without the measurement probe.

5. The method according to claim 1, characterized in that a momentary optical recording is displayed as transformed optical image in a live operating mode.

6. The method according to claim 1, characterized in that, on the display device, at least one scanning probe measurement image with scanning probe measurement values is shown, selectively in an at least partially superimposing presentation of the transformed optical image and scanning probe measurement image according to the coordinate transformation.

7. The method according to claim 1, characterized in that the presentation of the transformed optical image of the measurement section on the display device is repeatedly renewed.

8. The method according to claim 1, characterized in that the coordinate transformation is determined by comparing one or several previously recorded image points from one or several optical images, on the one hand, and corresponding measurement positions in the arrangement of measurement probe and measurement sample, on the other hand, with one another from which a generalised transformation rule is derived for the coordinate transformation.

9. The method according to claim 8, characterized in that the one or the several previously recorded optical images and the transformed optical image are recorded as at least one imaging type selected from the following group of image types: fluorescence image, back-lighting image and Raman spectroscopic image.

10. A measurement system for scanning probe microscopic and optical examination of a measurement sample, with:
    a scanning probe microscope, at which a measurement probe is formed;
    a recording device that is configured for recording optical images of measurement sections of a measurement sample under examination by means of the measurement probe within the framework of a scanning probe measurement, wherein the recording of the optical images of measurement section is during the operation of the measurement system with the scanning probe microscope;
    a control apparatus which is configured for transforming the optical images according to a previously determined coordinate transformation, which is an assignment between a coordinate system of the optical images and a coordinate system of a space covered by movement positions of the measurement probe and the measurement sample, wherein the transforming of the optical images is during the operation of the measurement system with the scanning probe microscope;
    a display apparatus which is coupled to the optical recording device as well as the control device and which is configured to display the transformed optical images, wherein the displaying of transformed optical images of measurement section is during the operation of the measurement system with the scanning probe microscope; and
    a movement apparatus which is configured for moving the measurement probe and the measurement sample under examination relative to one another;
    wherein the control apparatus is further coupled to the movement device and configured for the purpose of producing control signals for the movement apparatus for the scanning probe measurement after the detection of a selection of a position in the transformed optical images displayed on the display apparatus, with which the measurement probe is moved into a measurement position that is assigned to the position selected in the transformed optical images according to the coordinate transformation.

11. The measurement system according to claim 10, characterized in that the scanning probe microscope is an atomic force microscope, a scanning nearfield microscope or a scanning photon microscope.

12. The measurement system according to claims 10, characterized in that the control device is configured for the purpose of detecting the assignment between the coordinate system of the optical image and the coordinate system of the space covered by the movement positions of the measurement probe and the measurement sample in a pre-calibration process.

13. A method for calibration of a measurement system including a scanning probe microscope and an optical recording device, the method comprising the following steps:

providing a scanning probe microscope;

providing an optical recording device configured to record optical images;

recording, by the optical recording device, a plurality of optical images, wherein each optical image shows an object in different locations in a space spanned by relative movement positions of a measurement probe relative to at least one of a measurement sample and a sample holder of the scanning probe microscope; and determining a coordinate transformation between a coordinate system of the plurality optical images and a coordinate system of a space spanned by the relative movement positions of the measurement probe relative to at least one of the measurement sample and the sample holder, wherein the step of determining comprises a step of comparing one or more image positions of the object in the plurality of optical images on one hand and respective positions in the assembly of the measurement probe and at least one of the measurement sample and the sample holder on the other hand, and deriving a generalized transformation rule.

14. The method according to claims 2, characterized in that the measurement probe is displayed at least partially in the transformed optical image on the display apparatus.

15. The method according to claims 2, characterized in that the measurement section in the transformed optical image is displayed without the measurement probe.

16. The method according to claim 2, characterized in that a momentary optical recording is displayed as transformed optical image in a live operating mode.

17. The method according to claim 3, characterized in that a momentary optical recording is displayed as transformed optical image in a live operating mode.

18. The method according to according to claim 4, characterized in that a momentary optical recording is displayed as transformed optical image in a live operating mode.

19. The method according to according to claim 3, characterized in that, on the display device, at least one scanning probe measurement image with scanning probe measurement values is shown, selectively in an at least partially superimposing presentation of the transformed optical image and scanning probe measurement image according to the coordinate transformation.

20. The method according to according to claim 4, characterized in that, on the display device, at least one scanning probe measurement image with scanning probe measurement values is shown, selectively in an at least partially superimposing presentation of the transformed optical image and scanning probe measurement image according to the coordinate transformation.

* * * * *

UNITED STATES PATENT AND TRADEMARK OFFICE
CERTIFICATE OF CORRECTION

| | |
|---|---|
| PATENT NO. | : 8,368,017 B2 |
| APPLICATION NO. | : 12/160039 |
| DATED | : February 5, 2013 |
| INVENTOR(S) | : Jähnke et al. |

Page 1 of 1

It is certified that error appears in the above-identified patent and that said Letters Patent is hereby corrected as shown below:

On the Title page, Item (12) and Item (75) Inventors, please delete "Jahnke" and insert -- Jähnke --

Signed and Sealed this
Fourteenth Day of May, 2013

Teresa Stanek Rea
*Acting Director of the United States Patent and Trademark Office*